(12) United States Patent
Porter

(10) Patent No.: US 9,633,653 B1
(45) Date of Patent: *Apr. 25, 2017

(54) CONTEXT-BASED UTTERANCE RECOGNITION

(71) Applicant: Amazon Technologies, Inc., Seattle, WA (US)

(72) Inventor: Brandon William Porter, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,104

(22) Filed: Mar. 31, 2015

Related U.S. Application Data

(63) Continuation of application No. 13/338,099, filed on Dec. 27, 2011, now Pat. No. 9,009,025.

(51) Int. Cl.
*G10L 15/18* (2013.01)

(52) U.S. Cl.
CPC .............................. *G10L 15/1815* (2013.01)

(58) Field of Classification Search
USPC ................................................ 704/7–10, 257
See application file for complete search history.

(56) References Cited

U.S. PATENT DOCUMENTS

| | | | |
|---|---|---|---|
| 8,175,878 B1 | 5/2012 | Chelba et al. | |
| 2002/0116194 A1 | 8/2002 | Lewis et al. | |
| 2005/0256715 A1 | 11/2005 | Okimoto et al. | |
| 2009/0048833 A1 | 2/2009 | Fritsch et al. | |
| 2009/0226098 A1* | 9/2009 | Takahashi et al. | 382/218 |
| 2010/0299135 A1 | 11/2010 | Fritsch et al. | |
| 2010/0324901 A1* | 12/2010 | Carter et al. | 704/255 |
| 2011/0161072 A1 | 6/2011 | Terao et al. | |
| 2012/0029910 A1 | 2/2012 | Medlock et al. | |
| 2012/0191448 A1 | 7/2012 | Lloyd et al. | |
| 2012/0191449 A1 | 7/2012 | Lloyd et al. | |
| 2013/0304453 A9 | 11/2013 | Fritsch et al. | |

OTHER PUBLICATIONS

Office Action for U.S. Appl. No. 13/338,099, mailed on Apr. 14, 2014, Brandon W. Porter, "Context-Based Utterance Recognition", 16 pages.

Final Office Action for U.S. Appl. No. 13/338,099, mailed on Sep. 19, 2014, Brandon W. Porter, "Context-Based Utterance Recognition", 7 pages.

* cited by examiner

*Primary Examiner* — Leonard Saint Cyr
(74) *Attorney, Agent, or Firm* — Lee & Hayes, PLLC

(57) ABSTRACT

In some implementations, a digital work provider may provide language model information related to a plurality of different contexts, such as a plurality of different digital works. For example, the language model information may include language model difference information identifying a plurality of sequences of one or more words in a digital work that have probabilities of occurrence that differ from probabilities of occurrence in a base language model by a threshold amount. The language model difference information corresponding to a particular context may be used in conjunction with the base language model to recognize an utterance made by a user of a user device. In some examples, the recognition is performed on the user device. In other examples, the utterance and associated context information are sent over a network to a recognition computing device that performs the recognition.

20 Claims, 11 Drawing Sheets

CONTEXT-BASED UTTERANCE RECOGNITION

CROSS REFERENCE TO RELATED APPLICATIONS

This is a continuation of co-pending U.S. patent application Ser. No. 13/338,099 filed Dec. 27, 2011, entitled "Context-Based Utterance Recognition," which is incorporated herein by reference in its entirety.

BACKGROUND

Speech recognition is an automated technology that may include receiving an utterance from a person and recognizing the utterance as one or more words of a particular language. Speech recognition may rely on language models to improve the accuracy of the recognition of utterances. For example, by determining the probabilities for words that a person is likely to speak, the accuracy of speech recognition can be dramatically increased. Thus, a particular language may have a general or standard language model that provides a probability of the occurrences of particular words and sequences of words in the language. However, speech recognition among humans rarely involves recognition of isolated or independent utterances. For example, people recognize utterances of other people in various situational or spatiotemporal contexts that assist in eliminating ambiguities and enabling determination of a speaker's meaning. Consequently, context information may be used to further narrow the probabilities for recognizing a phrase corresponding to a particular utterance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Context-Based Language Model Information

Figure 1:
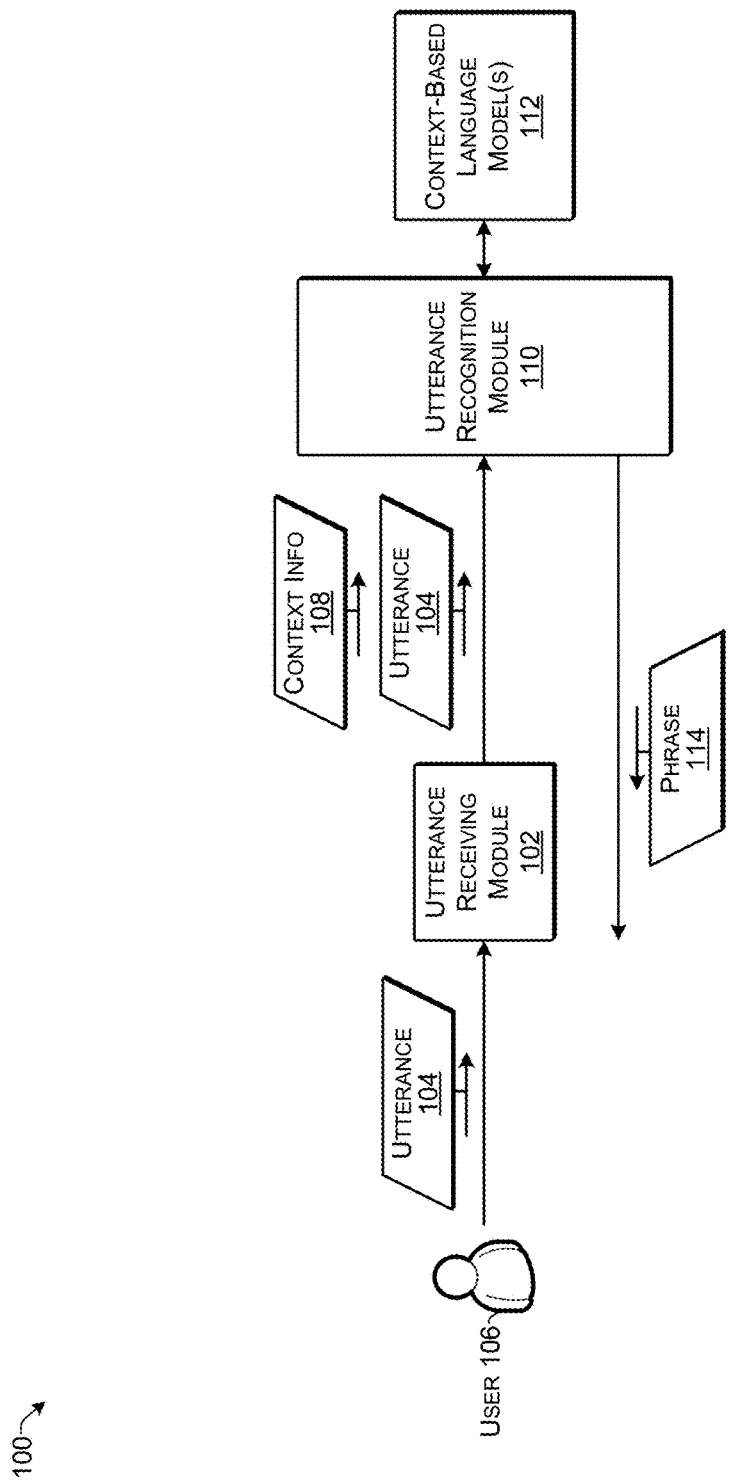
FIG. 1 illustrates an example framework employing one or more context-based language models for recognizing an utterance according to some implementations.

This disclosure includes techniques and arrangements for generating and using custom or context-based language model information for speech recognition. In some implementations, a digital work provider may provide language model information that corresponds to a number of different contexts for use in context-based utterance recognition. For instance, in response to receiving an utterance and an indication of a context of the utterance, language model information corresponding to the context of the utterance may be used for performing recognition of the utterance. In some implementations, information for one or more language models may be generated in the context of one or more digital works. For example, different instances of language model information may be provided for each different digital work in a library of digital works. Accordingly, when an utterance is made in the context of a particular digital work, corresponding language model information may be used during recognition of the utterance so that recognition is performed based on the probabilities of the words contained in the particular digital work. In addition, in some examples, the language model information applied during recognition may also take into consideration user-selected quotations for one or more digital works, popular quotations, social media discussions, online forum content, microblog content, reviews of digital works, or the like, which can be used to further weight probabilities associated with certain word sequences of a language model.

Some implementations provide speech recognition in the context of a digital work, such as a digital work that includes textual content or that has textual content associated therewith. As one nonlimiting example, a user may issue an utterance, such as a word, name or other phrase contained in a digital work. The utterance may be recognized as an identified phrase based at least in part on a context-based language model. For example, the context-based language model may be generated based, at least in part, on at least some of the content of the digital work. Thus, in some instances, recognition of the utterance may be performed in the context of a particular digital work displayed on a user device. For example, if the utterance is a request to locate a particular phrase within the digital work, the user device may receive the utterance and, in response, present the user with one or more locations of the phrase in the digital work. For instance, the digital work may be displayed on the user device, and a page of the digital work that contains the requested phrase may be displayed in a user interface provided on the user device in response to the utterance.

In some examples, the speech recognition functionality may be provided by an online or cloud-based speech recognition provider. For example, a user device may be in communication with the speech recognition provider, and may transmit a received utterance to a computing device of the speech recognition provider. The speech recognition provider may perform recognition of the utterance and return a recognition result, such as a recognized phrase, back to the user device. The user device may then utilize the recognized phrase to perform one or more subsequent functions, such as locating a requested phrase in a digital work, or the like.

Further, in some instances, the user device may transmit a context of the utterance along with the utterance itself. For example, in the context of a digital work, the user device may transmit an identity of the digital work currently displayed on the user device along with the utterance. Consequently, the speech recognition provider may employ a language model that is generated based on the identified digital work when performing the recognition of the utterance received from the user device. Additional context information that may be utilized by the speech recognition provider includes phrases selected or highlighted in the past by the user and/or annotations made by the user to the current digital work and/or other digital works. Furthermore, other context information may include crowd-sourced information such as popular phrases or quotations associated with the particular digital work or other digital works, such as may be obtained from network resources such as Wikipedia®, SheHari®, IMDb® (the Internet Movie Database), online encyclopedias, online discussion forums, social networks, microblog sites, reviews of digital works, or other suitable sources of information related to particular digital works.

In some examples, the speech recognition provider may be a separate entity from the publisher or provider of the digital works. Therefore, the speech recognition provider may not have the right to access the entire library of digital works for generating the context-based language models for each of the digital works in the library. Consequently, rather than using the full content of a digital work to generate a language model for the digital work, language model differences may be provided to the speech recognition provider to enable generation of the language model for each digital work of a plurality of digital works. For example, a base language model may be generated from one or more sources, such as from analysis of a huge number of digital works (e.g., electronic books (eBooks) or other digital works that may have text associated with them, such as songs, movies, television shows and the like). The base language model can then be used by the speech recognition provider as a baseline for generating custom language models for each digital work in a library of digital works.

In some examples, the digital work provider may generate, for each digital work in the library, language model difference information, and the digital work provider may provide the language model difference information to the speech recognition provider. The language model difference information may represent sequences of one or more words (referred to herein as n-grams) that occur in the book with a different probability than in the base language model, e.g., different by more than a predetermined threshold probability. The speech recognition provider may receive the language model difference information from the digital work provider, and apply the language model difference information to the base language model. In some examples, the language model difference information may be applied to the base language model during recognition of an utterance. In other implementations, a custom context-based language model may be generated in advance for each digital work using the base language model and the language model difference information. For example, the language models herein may include a probability-weighted distribution of n-gram sequences for the digital work. Each n-gram sequence may be a sequence one or more words, and the language model may include a probability of occurrence of the sequence in the digital work.

In other examples, the user device may include the capability to perform the speech recognition function. For example, the user device may include a language model information receiving module that can receive the language model difference information for a particular digital work present on the user device. Accordingly, the user device itself may generate a context-based language model based on the language model difference information received in association with the particular digital work and the base language model. For example, when the user device receives a particular digital work, the user device may receive the language model difference information associated with the particular digital work on the user device. In some instances, when the user issues an utterance while the particular digital work is displayed, the user device may utilize the base language model and the language model difference information corresponding to the particular digital work when performing a speech recognition function on the utterance.

Furthermore, implementations herein are not limited to the examples provided, but may be extended to other environments for context-based speech recognition, as will be apparent to those of skill in the art in view of the disclosure herein.

Example Speech Recognition Framework

FIG. 1 illustrates an example framework 100 for performing speech recognition according to some implementations. The framework 100 includes an utterance receiving module 102 that receives an utterance 104 from a user 106. For example, utterance receiving module 102 may be a functional component implemented on a user electronic device or the like (not shown in FIG. 1). The utterance receiving module 102 may provide the utterance 104 along with context information 108 to an utterance recognition module 110. In some implementations, the utterance recognition module 110 may be included on the same user device as the utterance receiving module 102. In other implementations, the utterance recognition module 110 may be implemented by a separate device or entity such as by an online or cloud-based recognition service provider (not shown in FIG. 1).

The utterance recognition module 110 may utilize one or more customized or context-based language models 112 to recognize the utterance 104. For example, the utterance recognition module receives the context information 108 and may utilize the context information 108 to select a particular context-based language model 112 to use for recognizing the utterance 104. As one example, the context-based language model may be generated in advance in anticipation of the submission of an utterance in a particular context. As another example, the context-based language model for a particular context may be generated the first time that the user 106 accesses a particular digital work. As still another example, the context-based language model 112 is formed during recognition by applying language model difference information to a base language model, as discussed below, when the user 106 submits an utterance for recognition.

The utterance recognition module 110 performs recognition of the utterance 104 based on the context information 108. For example, the context information 108 provides an indication of an appropriate context-based language model 112 to use during recognition to determine a recognition result, such as a phrase 114 that corresponds to the utterance 104. The utterance recognition module 110 may return the phrase 114 for use by the utterance receiving module 102 or other module, functional component, or the like. As one nonlimiting example, the phrase 114 may be used to search a currently open digital work to locate an occurrence of the phrase 114 in the digital work. As another example, the phrase may be used to search a plurality of digital works in a user's library of digital works. Furthermore, the speech recognition framework 100 may be employed for numerous other purposes and functions, and therefore, implementations herein are not limited to any particular outcome, use or application of the framework 100.

Example Language Model Generation Framework

Figure 2:
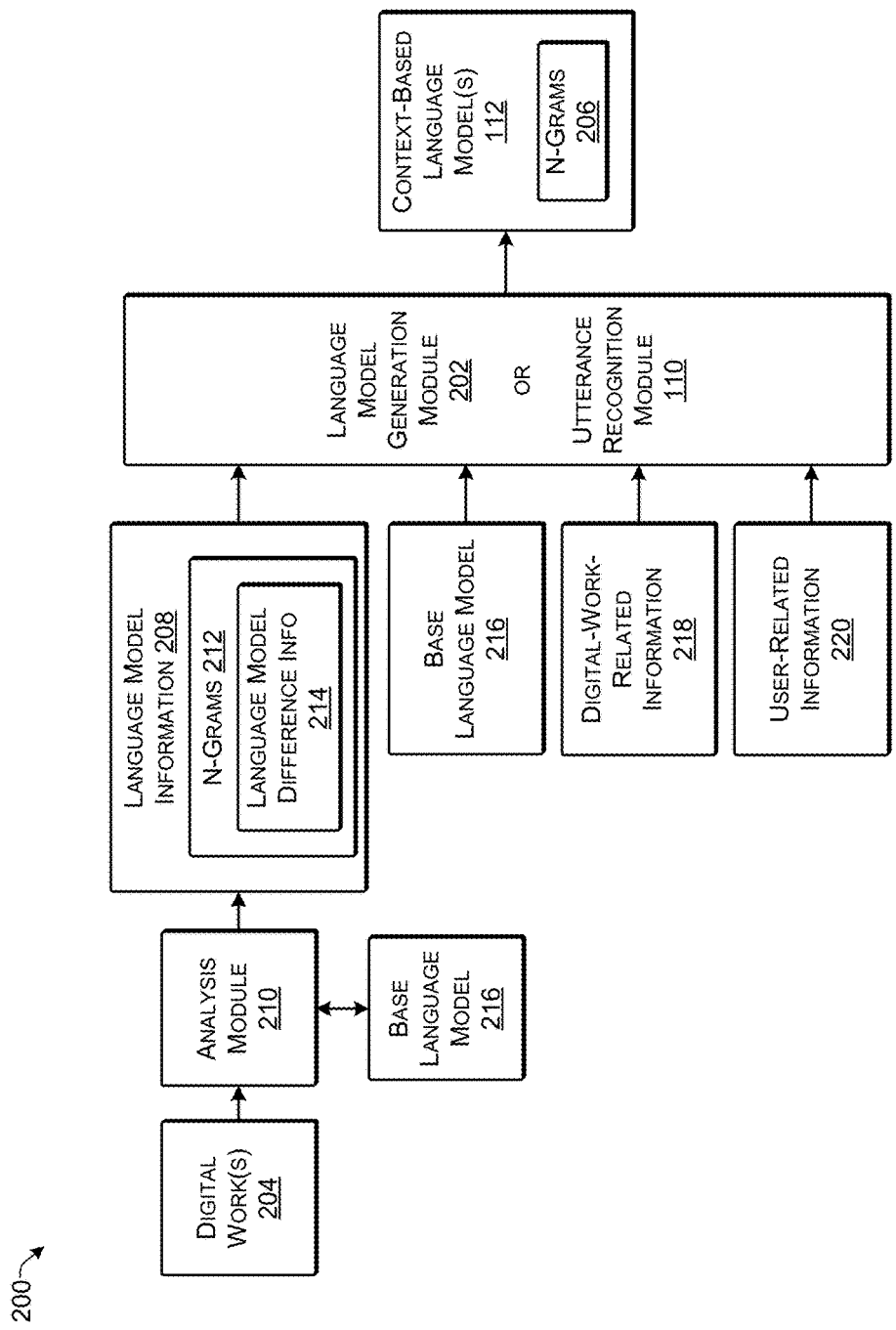
FIG. 2 illustrates an example framework for providing language model information related to one or more digital works according to some implementations.

FIG. 2 illustrates an example of a framework 200 for generating information for a customized or context-based language model 112 according to some implementations herein. In some examples, a language model generation module 202 may be executed to generate one or more context-based language models 112 in advance. However, in other implementations, one or more context-based language models 112 are generated by the utterance recognition module 110 during recognition of an utterance by applying language model difference information to a base language model.

A plurality of context-based language models 112 may correspond to a plurality of respective digital works 204. The context-based language models 112 may indicate a probability of words or word sequences, i.e., the probability that a word occurs by itself and the probability of a word following one or more other words in a particular context, such as in a digital work, or in a portion or subset of a digital work. A speech recognizer uses the weighted probability distributions of the language model to apply a confidence level to various possibilities for recognition of an utterance. Accordingly, a particular context-based language model 112 may be utilized by a speech recognizer for recognizing an utterance made in the context of a particular respective digital work 204 from which a particular language model 112 is generated to provide more accurate recognition than if a standard language model were used for recognition.

In some implementations herein, the language models 112 may be based, at least in part, on the use of n-grams 206 for modeling speech. For example, an n-gram 206 is typically a contiguous sequence of n items from a given portion of text or speech. For simplicity, in implementations herein, n-gram items are described as words, and thus n-grams 206 may be word sequences made up of one or more words in sequence. However, in other implementations, the n-gram items may be phonemes, syllables, letters, or base pairs, and thus implementations herein are not limited to the particular examples described.

To generate a language model, a corpus of text or speech may be parsed and divided into a plurality of unique n-grams. For instance, an n-gram of size 1 is referred to as a "unigram," an n-gram of size 2 is referred to as a "bigram," an n-gram of size 3 is a "trigram," an n-gram of size 4 is referred to as a "four-gram," and an n-gram of size 5 or larger may merely be referred to as an "n-gram." As one nonlimiting example, during generation of a language model from a particular body of text, the text may be parsed into a plurality of unique n-grams. The n-grams that occur more frequently in the body of text may be assigned a higher probability than the less-frequently-occurring n-grams. Thus, in some examples herein the language models 112 may be probabilistic language models that are applied for predicting the next word in a sequence of words. Various types of statistical models may be employed such an (n−1)-order Markov model, a hidden Markov model, or other suitable statistical models. As a nonlimiting example, the context-based language models 112 may each include a probability-weighted distribution of n-grams 206 generated from a particular digital work 204 corresponding to the particular context-based language model 112.

As mentioned above, context-based language models 112 for different digital works 204 may include different probability weightings for different n-grams. For instance, a first digital work 204 may include numerous references to the Queen of England, while a second digital work 204 may include numerous references to the Queen of Spades. Consequently, when an utterance is submitted for recognition that includes "the queen of," the probability that the next word is "England," "spades," or some other word is significantly different when taken in the context of the first digital work or the second digital work. Accordingly, performing recognition on the utterance in the context of a particular context-based language model 112 can significantly increase the accuracy of recognition of an utterance.

In some implementations herein, a context-based language model 112 for each digital work 204 in a library of digital works may be generated directly from the digital works 204. However, in some instances the language model generation module 202 may not have access to the digital works 204. For example, due to copyright laws, licensing agreements, storage limitations, and so forth, the language model generation module 202 may not have access to the digital works 204 or may not have the resources to perform direct language model generation. As one particular example, the language models 112 may be generated or maintained by a separate entity from an owner, publisher or provider of the digital works 204. For instance, an online or cloud-based speech recognition provider may generate, maintain and/or utilize the language models 112 for a plurality of digital works 204. However, the speech recognition provider may not have the rights to receive the digital works 204 themselves. As another example, an user electronic device may have limited resources, and may not have storage capacity to maintain a large number of different language models 112.

Accordingly, rather than receiving the digital work 204 itself, in some implementations, the language model generation module 202 may merely receive language model information 208 for generating a particular context-based language model 112. In one example, the language model information 208 may be a probability distribution of word sequences for a particular digital work or a portion of a digital work, such as a chapter, page, dialog segment, etc. Consequently, a digital work referred to herein may include only a portion or subset of an entire digital work.

As one example, the analysis module 210 may parse the text of a digital work 204, such as an eBook, into n-grams 212, i.e., unigrams, bigrams, trigrams, and four-grams, and a probability may be associated with each n-gram based on a frequency of occurrence of the n-gram 212 within the digital work 204. Thus, in some implementations, a file of n-grams 212 and associated probabilities may be provided as language model information 208 to the language model generating module 202 for generating or providing a context-based language model 112 corresponding to a particular digital work 204.

Using this technique, the language model information 208 may be a number of times larger than the corresponding digital work 204, depending on the size of the largest n-grams analyzed. Accordingly, in other implementations herein, the language model information 208 provided to the language model generation module 202 may include only language model difference information 214 that provides only significant differences over a base language model 216. For example, a base language model 216 may be provided to the language model generation module 202 and/or the utterance recognition module. In some implementations, the base language model 216 may represent or approximate a standard language model, such as for the English language or other applicable human language to be recognized. The base language model 216 may be generated from a large body of text or other suitable sources for the particular language. As one nonlimiting example, the base language model 216 may be generated by the analysis module 210, or other suitable functional component, from thousands or hundreds of thousands of eBooks or other digital works maintained by a publisher, digital work provider, or the like. In addition, or alternatively, the base language model 216 may be generated from one or more text-based network resources such as webpages, news feeds, social network sites, microblogs, closed captioning feeds, or the like. Accordingly, the base language model 216 may include a probability-weighted distribution of n-gram sequences for the particular language that may generally represents an overall occurrence of the n-gram sequences in common usage of the language.

Each digital work 204 for which a corresponding context-based language model 112 will be generated may be provided to the analysis module 210. The analysis module 210 may parse each digital work into n-gram sequences such as from unigram up to four-gram sequences. The analysis module 210 may then determine the language model information 208, which may include language model difference information 214. The language model difference information 214 may represent differences between the base language model 216 and the n-gram probabilities of the current digital work 204. For example, the language model differences 208 may include language model difference information 214 that may identify n-grams 212 that have probabilities of occurrence that are significantly different between the language model for the digital work 204 and the base language model 216. In other words, the analysis module 210 determines the n-grams 212 for the particular digital work 204 having probabilities that do not conform to the base language model 216 by a predetermined threshold amount.

The probabilities associated with the n-grams 212 for the particular digital work 204 may be compared with the probabilities for those n-grams in the base language model 216. When the probability for a particular n-gram 212 differs from the probability for the particular n-gram in the base language model 216 by a predetermined amount, then the n-gram 212 and its associated probability may be included in the language model difference information 214 provided to the language model generation module 202 and/or the utterance recognition module 110.

As one example, a standard deviation may be established and if a probability for a particular n-gram 212 from the digital work 204 exceeds the standard deviation, then the particular n-gram 212 may be included in the language model difference information 214. As another example, the analysis module 201 may generate an ordered list of n-grams 212 for the digital work 204 based on an order of probability of occurrence. If a particular n-gram 212 is a predetermined distance or more from its location in the base language model 216, then the n-gram 212 may be included in the language model difference information 214. For example, if a particular n-gram 212 is in the 50th percentile of probability of occurrence in the base language model 216 and in the 70th percentile of probability of occurrence in the language model for the particular digital work 204, and the threshold difference is 10 percentile points, then the particular n-gram 212 may be included in the language model difference information 214. Consequently, rather than sending an entire digital work 204 to the language model generation module 202, merely the language model difference information 214 for a particular digital work 204 is provided to the language model generation module 202 and/or the utterance recognition module 110. The language model generation module 202 or the utterance recognition module 110 may then use the language model difference information 214 and the base language model 216 to construct a context-based language model 112 that corresponds to the particular digital work 204.

As mentioned above, in some examples, a custom language model 112 may be prepared in advance by the language generation module 202 for each digital work 204 in a library of digital works. The custom language models 112 may be generated without transferring any of the digital works 204 from the library to the language model generation module 202. Furthermore, in other examples, rather than generating the context-based language models 112 in advance, the language model difference information 214 for each digital work may be retained and applied as weighting by the utterance recognition module 110 during recognition in the context of a particular digital work 204. In other words, rather than generating a complete language model 112 in advance for the each digital work 204, which may take up a considerable amount of storage resources, only the difference information 214 for each digital work 204 and the base language model 216 are maintained. During recognition in the context of a particular digital work 204, the language model difference information 214 is accessed and used by the utterance recognition module 110 in conjunction with the base model language 216 to recognize an utterance made in the context of the particular digital work 204. Accordingly, the utterance recognition module 110 may in effect generate and/or use one or more of the context-based language models 112 while performing recognition without storing a permanent instance of the context-based language model 112. Such an arrangement may be applied in a memory-constrained environment, such as on a user device, as discussed below.

In addition, in some examples, additional information may be applied by the language model generation module 202 when generating the context-based language model 112 for each digital work 204, and/or by the utterance recognition module 110 when performing recognition of an utterance. For example, digital-work-related information 218 may be gathered from a number of different sources to provide further statistical information regarding the probabilities of particular n-grams for the context-based language model 112 for a particular digital work. For example, the language model generation module 202 may be provided with information obtained from one or more network resources such as a Wikipedia® page related to a digital work 204. Numerous other potential sources of digital-work-related information 218 may include information related to a digital work 204 obtained from the SheHari® or IMDb® websites, and information related to a digital work 204 obtained from websites, online forums, social networking sites, microblog sites, book reviews, and so forth. For example, readers of digital works may often discuss characters and events from certain digital works online, may post or discuss favorite quotations from digital works, and the like. Accordingly, this information may be used to further provide probability weighting for particular n-gram sequences in a context-based language model 112 for a particular digital work, and/or may be applied by the utterance recognition module 110 when performing recognition.

Additionally, in some examples, user-related information 220 may also be applied when generating a context-based language model 112 and/or by the utterance recognition module 110 during recognition. For example, certain electronic book reading devices (eBook readers) and/or eBook software may enable a user to highlight or bookmark desired portions of an eBook. Information regarding the highlighted portions of a particular digital work made by one or more users may be used by the language model generation module 202 and/or the utterance recognition module 110 to further weight certain n-grams for a particular language model 112. For instance, frequently highlighted or popular portions of a digital work 204 may also be more likely to be the subject of a search by a user. Consequently, when the user issues an utterance in the context of a particular digital work 204, there may be a high likelihood that the user is searching for a frequently highlighted or popular portion of the digital work. Accordingly, the language model generation module may include further weight the probabilities of certain n-grams in the context-based language models 112. Furthermore, during the recognition stage, this information for a particular user may also be applied by the utterance recognition module 110 to increase the probabilities of particular n-grams in the context-based language model 112 for the particular digital work 204 to further aid in recognition of an utterance from a particular user 106.

In addition to, or alternatively to, providing information for creating a context-based language model 112 for each digital work in a library of digital works, information may be provided for creating context-based language models 112 for various classes, categories, genres or types of digital works 204. For example, a large number of eBooks on cooking may be analyzed by the analysis module 210 to generate a category language model (not shown in FIG. 2) whose context is directed to the category of cooking. Various different categories of category language models may be generated for numerous different categories, subjects and genres of digital works. Accordingly, in some implementations herein, a hierarchy of language models may be established for different types of subjects, such as the base language model 216, a genre or category language model, a subcategory language model (not shown in FIG. 2), if applicable, and so forth. Consequently, when a digital work can be classified into a particular category or subcategory, then the category or subcategory language model may be used in place of the base language model 216. Thus, only the differences over the particular category or subcategory language model are provided rather than differences over the base language model 216. Similarly, in some implementations, only the differences of the category language model over the base language model 216 may be provided, and so forth. Numerous other variations will be apparent to those of skill in the art in light of the disclosure herein.

Example Architectures

Figure 3:
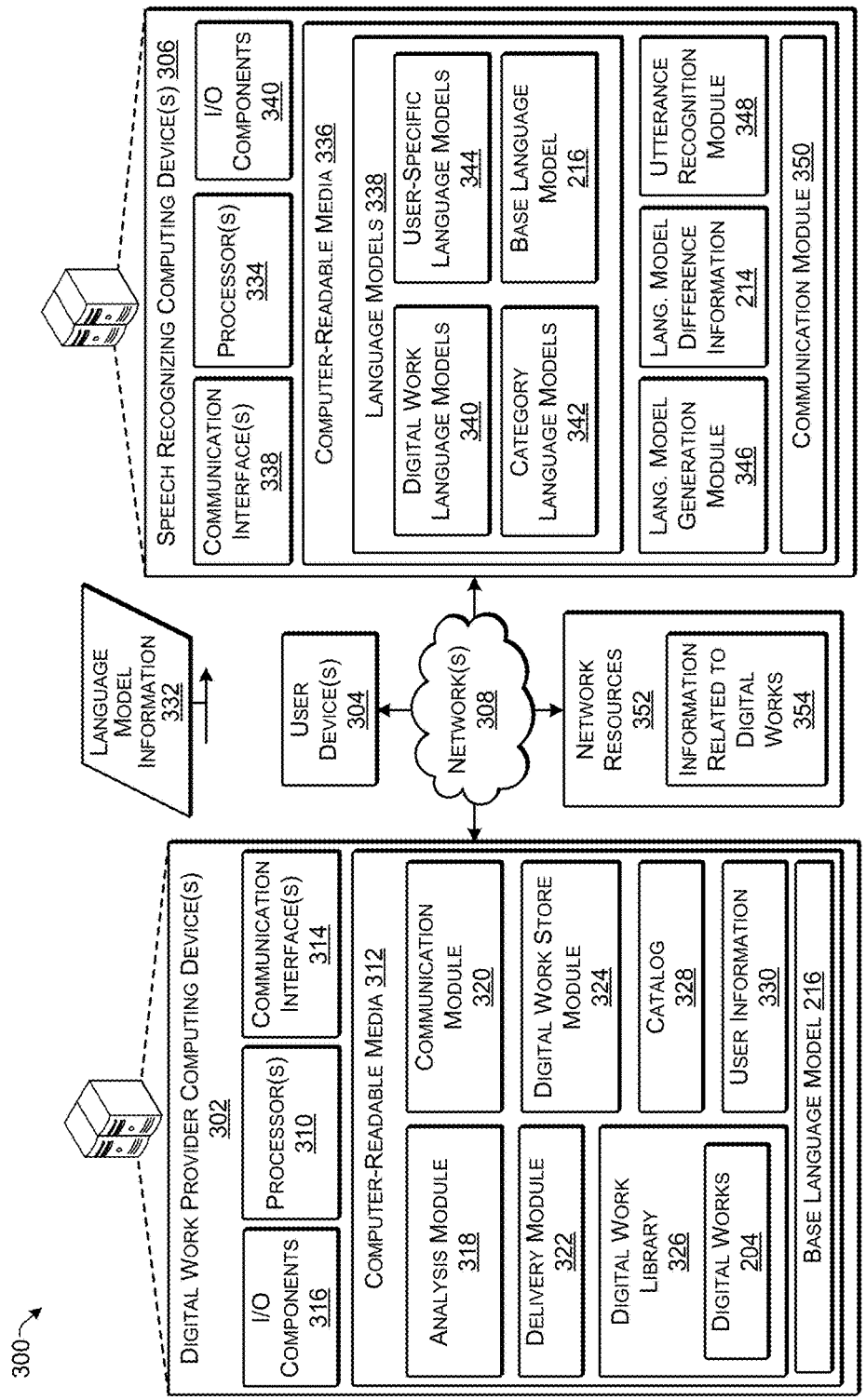
FIG. 3 illustrates an example architecture of a system for providing language model information related to one or more digital works according to some implementations.

FIG. 3 illustrates an example architecture of a system 300 including at least one digital work provider computing device(s) 302 for providing one or more digital works 204 to at least one user device(s) 304 according to some implementations. In some implementations, the digital work provider computing device 302 may offer digital works 204, such as books, magazines, newspapers, songs, movies, and so forth, to the public through a website, other type of electronic commerce site, an online location, or the like. In some examples, the digital work provider computing device 302 may alternatively, or additionally, provide digital works 204 through an online or mobile application (not shown in FIG. 3) executing on the user device 304. For example, an application (not shown in FIG. 3) on the user device 304 may connect to or obtain content from the digital work provider computing device 302 to enable the purchase or management of digital works 204, and the like. Thus, the digital work provider computing device 302 may enable a user device 304, such as an eBook reader, a smart phone, a tablet computing device, or the like, to access digital works 204 through an online or mobile application. Accordingly, the digital work provider computing device 302 is not limited to providing a website accessed by a browser, but may encompass other technologies for providing digital works, such as through in-application shopping, and the like.

The digital work provider computing device 302 is able to communicate with the user device 304 and at least one speech recognizing computing device(s) 306 through at least one network(s) 308. For example, the network(s) 308 may include any appropriate network, such as a local area network (LAN), a wide area network (WAN), e.g., the Internet, or any combination thereof, and may include both wired and wireless communication technologies using any suitable protocols and communication techniques. The digital work provider computing device 302, the user device 304, and the speech recognizing computing device 306 may communicate and interact with one another using any combination of suitable communication and networking protocols, such as Internet protocol (IP), transmission control protocol (TCP), hypertext transfer protocol (HTTP), and so forth.

In some implementations, the digital work provider computing device 302 and/or the speech recognizing computing device 306 may include one or more servers or other types of computing devices that may be embodied in any number of ways. For instance, in the case of a server, the digital work provider computing device 302 and/or the speech recognizing computing device 306 may be implemented as a single server, a cluster of servers, a server farm or data center, a cloud hosted computing service, and so forth, although other computer architectures (e.g., a mainframe architecture) may also be used.

Further, while the figures illustrate the components of the digital work provider computing device 302 and/or the speech recognizing computing device 306 as being present in a single location, it is to be appreciated that these components may be distributed across different computing devices and locations in any manner Generally, digital work provider computing device 302 and/or the speech recognizing computing device 306 may provide the various functionalities described herein distributed in various ways across different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 3, the digital work provider computing device 302 includes one or more processors 310, one or more computer-readable media 312, and one or more communication interfaces 316. The processor(s) 310, as well as the other processors described herein, may be a single processing unit or a number of processing units, and may include single or multiple computing units or multiple cores. The processor(s) 310 can be configured to fetch and execute computer-readable instructions stored in the computer-readable media 312.

The computer-readable media 312, as well as the other computer-readable media described herein, may include volatile and nonvolatile memory and/or removable and non-removable media implemented in any type of technology for storage of information, such as computer-readable instructions, data structures, program modules, or other data. Such computer-readable media 312 includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the digital work provider computing device 302, the computer-readable media 312 may be a type of computer-readable storage media and may be a non-transitory storage media.

The communication interface(s) 314, as well as the other communication interfaces described herein, may include one or more interfaces and hardware components for enabling communication with various other devices, such as the user device 304 and/or the speech recognizing computing device 306, over the network(s) 308. For example, communication interface(s) 314 may facilitate communication through one or more of the Internet, cable networks, cellular networks, wireless networks (e.g., Wi-Fi, cellular, near-field) and wired networks. Various different approaches to examples described herein can be implemented in various environments. For instance, the network(s) 308 may include any appropriate network, including an intranet, the Internet, a cellular network, a LAN, WAN, VPN (Virtual Private Network) or any other network or combination thereof. Components used for such a system can depend at least in part upon the type of network and/or environment selected. Protocols and components for communicating via such networks are well known and will not be discussed herein in detail.

Digital work provider computing device 302 may further be equipped with various input/output (I/O) components 316. Such I/O components 316 may include a display, various user interface controls (e.g., buttons, mouse, keyboard, touch screen, etc.), audio speakers, connection ports and so forth.

The computer-readable media 312 may be used to maintain any number of functional components that are executable by the processors 310. In many implementations, these functional components comprise instructions or programs that are executable by the processors 310 and, when executed, implement operational logic for performing the actions attributed to the digital work provider computing device 302. Select example functional components of the digital work provider computing device 302 that may be executed on the processor(s) 310 for implementing the various functions and features related to providing digital works and language model information, as described herein, include an analysis module 318, which may correspond to the analysis module 210 discussed above in some implementations, a communication module 320 for communicating with the speech recognizing computing device 306, a delivery module 322 to make digital works 204 available for delivery to a user device 304, and a digital work store module 324 to enable access to or purchase of digital works 204 by a user device 304. Additional functional components stored in the computer-readable media 312 that are not shown in FIG. 3 may include an operating system for controlling and managing various functions of the digital work provider computing device 302 and various other site components for enabling online or electronic commerce.

In addition, the computer-readable media 312 may include, or the digital work provider computing device 302 may access, a digital work library 326, including the digital works 204, a catalog 328 of the digital works 204 provided by the digital work store module 324, and user information 330. The computer readable media 312 may also include an instance of the base language model 216 as described above for use by the analysis module 318 in determining differences between a language model for a particular digital work and the base language model 216. In some instances, the analysis module 318 may generate the base language model 216 from the plurality of digital works 204 maintained in the digital work library 326. The digital work provider computing device 302 may also include many other logical, programmatic and physical components, of which those described above are merely select examples that are related to the discussion herein.

As mentioned above, the digital work provider computing device 302 may include a digital work store module 324 that may provide or may access the digital work catalog 328. For example, the digital work store module 324 may present the digital work catalog 328 to a user device 304 that accesses the digital work provider site to shop for a digital work 204. The digital work catalog 328 may include searchable and/or browsable listings and descriptions of digital works 204 available from the digital work provider computing device 302. The digital work store module 324 may communicate with an application, such as a browser or mobile application (not shown in FIG. 3), on the user device 304 to enable the user 106 to locate and acquire a digital work 204 from the digital work library 326.

The digital work provider computing device 302 further includes the delivery module 322 that may deliver a digital work 204 to the user device 304. For example, in some instances, the delivery module 322 may facilitate the download of a digital work 204 to the user device 304 over the network(s) 308. In some implementations, the delivery module 322 may also provide for delivery of one or more language models or language model difference information 214 to the user device 304. Consequently, in some examples, a user device 304 may obtain a digital work 204 from the digital work store module 324. The delivery module 322 may provide for delivery of the digital work 204 to the user device 304 and, contemporaneously, may also provide for delivery of language model information corresponding to the particular digital work 204 to the user device 304. In other implementations, however, as mentioned above, the language model information is delivered to the speech recognizing computing device 306, rather than the user devices 304, to enable a remote or online recognition provider to provide utterance recognition services.

The digital work provider computing device 302 may include or may access the digital work library 326 and user information 330. For example, the digital work library 326 may include the plurality of digital works 204 that the digital work provider has available for access by users 106, such as by purchase through selection from the digital works catalog 328. Further, the user information 330 may include information for a plurality of users 106 of the digital work provider site. For example, the user information 330 may include account information for each user 106 for identifying and interacting with the user, such as name, email address, mailing address, telephone number, user identification (ID) number, user purchase history (e.g., digital works 204 acquired by the user) and so forth. Furthermore, in some instances, when a user highlights or annotates a digital work 204 on a user device 304, the user information 330 may also include this information. In addition, highlights or annotations of a plurality of users may be aggregated in the user information 330 to determine one or more popular highlights for a particular digital work 204. N-grams corresponding to such popular highlights may be given a higher probability in a language model for the particular digital work 240.

The digital work provider computing device 302 may send language model information 332 to the speech recognizing computing device 306. The language model information 332 may include language model information (e.g., language model difference information or an entire set of n-grams and associated probabilities) for one or more particular digital works, titles, identification numbers, or other identifiers for the particular digital works, the base language model 216, and so forth.

In some implementations, the speech recognizing computing device 306 may be the same computing device as the digital work provider computing device 302. However, in other implementations, the speech recognizing computing device 306 may be separate from the digital work provider computing device 302. As a nonlimiting example, the speech recognizing computing device 306 may be operated by a separate entity from the digital work provider computing device 302. For instance, the speech recognizing computing device 306 may be operated by a cloud-based speech recognition provider.

The speech recognizing computing device 306 may include one or more processors 334, computer readable media 336, communication interfaces 338, and I/O components 340. The processor(s) 334 may be similar to the processor(s) 310 described above, the communication interface(s) 338 may be similar to the communication interface(s) 314 described above, and the I/O components 340 may be similar to the I/O components 316 described above. Furthermore, the computer-readable media 336 may be similar to the computer-readable media 312 described above, but may include different components and data contained therein. For example, the computer readable media 336 may include language models 338, which may correspond, at least in part, to the language models 112, 216 discussed above. For example, the language models 338 may include digital work language models 340, which may be context-based language models, each generated in the context of a different particular digital work 204.

In addition, the language models 338 may include category language models 342, which may be context-based language models generated in the context of a plurality of digital works 204 that fall into the same category or subject matter. For example, the category language models 342 may each be generated from a large number of digital works directed to a particular subject such as, political science, social science, medicine, cooking, travel, computer technology, history, romance novels, science fiction novels, and so forth. Accordingly, if a digital work language model 340 is not available for a particular digital work, a corresponding category language model 342 may be available to be used for recognition of an utterance made in the context of the particular digital work if the category for the particular digital work is known or provided as context information.

Additionally, when a plurality of category language models 342 are established for a plurality of different types of subject matter, these category language models 342, in some examples, may be used in place of the base language model 216. For instance, when the analysis module 318 analyzes a digital work from a first category for which a first category language model 342 has been created, the analysis module 318 may provide just the language model difference information providing differences as compared to the first category language model 342, rather than the differences over the base language model 216. Typically, these language model differences would be smaller than for the base language model 216, and thus, less language model difference information would be typically be transmitted in these implementations. Similarly, in some instances, rather than generating a complete category language model 342, language model differences between the category language model and the base language model may be used instead of a complete language model. Thus, a hierarchical series of language model difference information instances may be generated for providing recognition related to a particular digital work.

Furthermore, in some examples, the category language models 342 may be created by the language model generation module 346 of the speech recognizing computing device 306. For example, the language model generation module 346 may combine the language model difference information 214 for a large number of digital works that fall within in a particular category to generate a category language model 342 for the particular category. As with the other language models described herein, the category language model 342 may be maintained as language model difference information 214, and may be applied to the base language model 216 by the utterance recognition module 348 when performing utterance recognition.

In addition, the language models 338 may include user-specific language models 344. For example, the speech recognizing computing devices 306 may generate user specific language models 344 for specific users 106 based on the user information 330. In some instances, the user information may be included as part of the language model information 332 provided by the digital work provider computing device 302 to the speech recognizing computing device 306. For example, user information 330 with respect to a particular digital work 204 may be incorporated into the language model difference information 214 provided for the particular digital work. In this manner, user anonymity and privacy may be maintained.

Additionally, in other implementations, with the user's permission, more complete user information may be provided to the speech recognizing computing device 306, such as user highlights, user annotations to digital works, user contributions to forums and social media, or the like. For example, the speech recognizing computing device 306 may generate one or more user specific language models for each user device based on a user ID or the like associated with each user device 304. For example, the speech recognizing computing device 306 may maintain a user specific language model 344 for each digital work associated with a particular user device 304. For instance, each user device may have a library of digital works associated therewith, and the speech recognizing computing device 306 may generate a user specific language model for each of the digital works in the user's library based on both digital work language models 340 for the digital works and any additional user information 330 available for each of the digital works. In addition, the language models 338 may include the base language model 216 that can be used for generating the language models 340, 342, 344 from language model difference information 214, as discussed above.

Furthermore, in other examples, as described above, the digital work provider computing device 302 may provide a complete file of n-grams and associated probabilities to the speech recognizing computing device 306. Thus, rather than providing language model difference information 214 and the base language model 216, the digital work provider computing device 302 may provide, to the speech recognizing computing device 306, some or all of the n-grams 212 and associated probabilities identified for each digital work 204 as language model information 332. The language model generation module 346 may then use this language model information 332 to generate or maintain digital work language models 340 for each of the digital works 204. Other variations will also be apparent to those of skill in the art in light of the disclosure herein.

The computer readable media 336 may also include several functional components, such as a language model generation module 346, which may correspond to the language model generation module 202 described above in some implementations. Additional functional components may include an utterance recognition module 348, which may correspond to the utterance recognition module 110 described above in some implementations. Furthermore, the computer readable media 336 may include a communication module 350 to perform communications between the speech recognizing computing device 306, the user devices 304 and/or the digital work provider computing device 302.

As discussed above with respect to FIG. 2, in some instances, the analysis module 318 may generate the base language model 216. For example, the analysis module 318 may generate the base language model 216 from an analysis of n-grams in a large number of digital works 204 contained in the library 326. As one example, the analysis module 318 may analyze thousands or hundreds of thousands of digital works 204 in the library 326 to obtain the base language model 216, which may generally represent the probabilities of occurrence for a huge number of n-grams in a particular language such as English.

Subsequently, for a plurality of the digital works 204 in the library 326, the analysis module 318 may calculate language model difference information 214 by determining a difference between n-grams in a particular digital work 204 and the base language model 216. When the probability associated with a particular n-gram 212 in a particular digital work 204 is sufficiently different from the probability for the n-gram in the base language model 216 (e.g., exceeding a predetermined threshold difference or distance), then the particular n-gram and its associated probability may be included with the language model difference information 214 associated with the particular digital work 204. This language model difference information 214 may be provided to the speech recognizing computing device 306 as part of language model information 332 corresponding to the particular digital work 204. The language model generation module 346 and/or the utterance recognition module 348 on the speech recognizing computing device 306 may utilize the particular language model difference information 214 to generate a digital work language model 340 for the particular digital work either in advance, or during recognition. Accordingly, the speech recognizing computing device 306 may generate and/or use digital work language models 340 for a plurality of digital works without receiving the actual content of the digital works 204.

Furthermore, the system 300 may include or access network resources 352 that may include information related to digital works 354. Such network resources 352 may include online sources of information, such as Wikipedia®, Shelfari®, IMDb®, online encyclopedias, social networks, online forums, blogs and microblogs, book reviews, or other network resources, that may provide information related to one or more of the digital works 204. For example, the network resources may indicate certain phrases, quotations, or the like in the digital work 204 that are likely or highly probable to be a subject of a request or utterance with respect to the digital work 204. In some implementations, the digital work provider computing device 302 may obtain and apply this information when determining language model difference information. In other implementations, the speech recognizing computing device 306 may obtain and apply this information when generating or using a language model corresponding to a particular digital work 204. Other variations will also be apparent to those of skill in the art in light of the disclosure herein.

Figure 4:
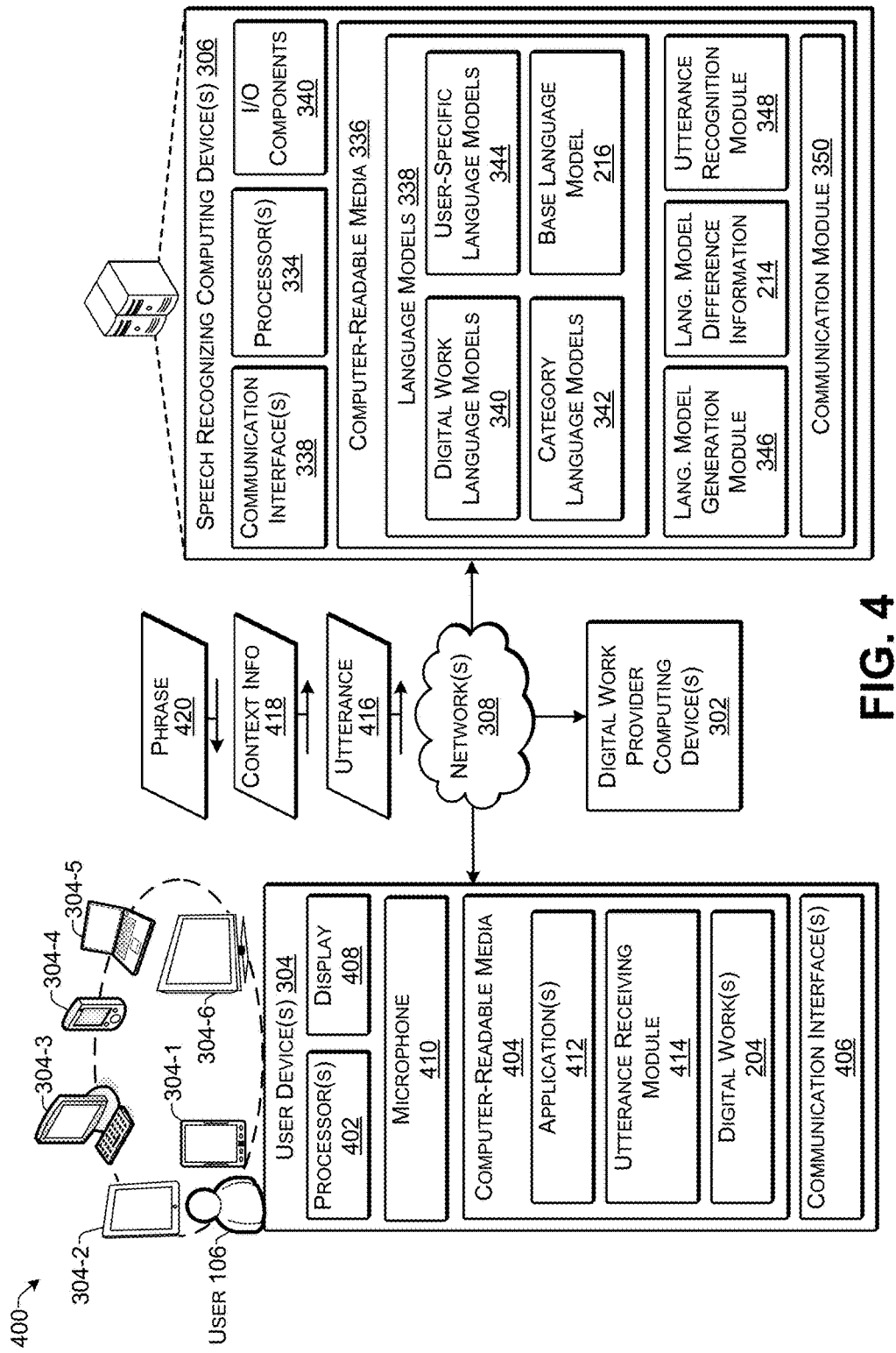
FIG. 4 illustrates an example architecture of a system for context-based utterance recognition according to some implementations.

FIG. 4 illustrates an example architecture of a system 400 for recognizing an utterance according to some implementations herein. The system 400 includes the one or more user devices 304 that may receive one or more of the digital works 204 from the digital work provider computing device 302. Several nonlimiting examples of the user devices 304 may include digital media devices and eBook readers 304-1, tablet computing devices 304-2, desktop computing devices 304-3, smart phones and mobile devices 304-4, laptop and netbook computing devices 304-5, televisions, gaming systems and home electronic devices 304-6, and any other device capable of accessing and rendering a digital work 204.

In the illustrated example, the user device 304 may include one or more processors 402, computer readable media 404, communication interfaces 406, a display 408, and a microphone 410. The processor(s) 402 may be similar to the processor(s) 310 described above and the communication interface(s) 406 may be similar to the communication interface(s) 314 described above.

The display 408 and the microphone 410 are nonlimiting examples of I/O components that may be included with the user device 304. In some examples, the display 408 may be a touchscreen type of display configured to sense a touch input received from a user for controlling the user device 304. In other examples, the display 408 may be non-touch sensitive. Accordingly, in addition to, or as an alternative to, the display 408, the user device 304 may include various controls and input devices, such as a virtual or physical keyboard, a mouse, a pointing stick, a touchpad, a trackball, a joystick, a remote control, buttons and/or various other controls for performing desired inputs and interactions with the user device 304 and digital works 204 displayed on the display 408. Additionally, in other implementations, one or more voice commands received through the microphone 410 may be used to control or interact with the user device 304, such as for opening, closing and navigating within digital works 204, searching within the digital works 204, and performing other functions. Thus, implementations herein are not limited to any type of input devices, techniques, or controls.

The computer-readable media 404 may be similar to the computer-readable media 312 described above, but may include different functional components and data. For example, computer readable media 404 may include one or more of the digital works 204. In some examples, the digital works 204 may include electronic books (eBooks) having one or more pages of text. For example, the display 408 may depict the text of the eBook and also any illustrations, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and multi-media content.

The computer readable media 404 may further include one or more applications 412 and an utterance receiving module 414. In some instances, the utterance receiving module 414 may be included as part of the one or more applications 412, while in other instances, the utterance receiving module 414 may be part of an operating system or other functionality (not shown) on user device 304. For example, the utterance receiving module 414 may receive an utterance 416 from a user 106 through the microphone 410. The utterance receiving module 414 or the application 412 may send the utterance 416 to the speech recognizing computing device 306 over the network 308. In addition, the utterance receiving module 414 or the application 412 may provide context information 418 with the transmitted utterance 416. In some examples, the context information 418 may identify a digital work 204 currently open on the user device 304, or that is otherwise a subject or target of the utterance. For instance, the application 412 may be an application for displaying a digital work 204 to a user 106 on the display 408. Thus, the application 412 may be an e-book reader application, a video display application, a music playing application, or other application for opening and/or consuming a digital work on the user device 304. Furthermore, in other implementations a digital work 204 identified by the context information 418 is not open on the user device 304 but may be otherwise identified by the user, such as through the utterance 416.

In some instances, the application 412 may be or may include a web browser, a mobile application, or other module or computer program configured to receive web content, webviews, online content, or the like, for accessing and interacting with the digital work provider computing device 302. For example, the application 412 may enable the user 106 to shop for digital works through the digital work provider computing device 302, and access or receive digital works 204 from the digital work provider computing device 302, such as by downloading through the network(s) 308.

As one nonlimiting example of use of the system 400 of FIG. 4, suppose that the user 106 opens a particular digital work 204 on the user device 304 and desires to determine the location of a particular phrase in the open digital work 204. The user 106 may say something along the lines of "Find the next occurrence of Wicked Witch," which is received by the utterance receiving module 414 as an utterance 416. In response, the utterance receiving module 414 or the application 412 may provide the utterance 416 to the speech recognizing computing device 306 along with context information 418. As one example, the context information 418 may include an identifier of the digital work 204 currently open on the user device 304.

The utterance recognition module 348 may receive the utterance 416 and the context information 418 and select a particular digital work language model 340 that corresponds to the digital work identified in the context information 418. For example, if the digital work 204 currently open on the user device 304 is the eBook version of the *Wonderful Wizard of Oz*, the utterance recognition module 348 may access the digital work language model 340 for the *Wonderful Wizard of Oz*. Alternatively, in the case that the digital work language model 340 is not generated in advance, the utterance recognition module may access an instance of language model difference information 214 that corresponds to the *Wonderful Wizard of Oz*, along with the base language model 216, to create a digital work language model 340 on the fly during recognition of the utterance 416.

The utterance recognition module 348 may use the particular digital work language model 340 to recognize the utterance 416 and may return a phrase 420 to the user device 304. For instance, because the n-gram "Wicked Witch" occurs substantially more frequently in the *Wonderful Wizard of Oz* than in the base language model 216, the recognition performance for recognizing "Wicked Witch" is improved by using the language model difference information 214 that corresponds to the *Wonderful Wizard of Oz* as compared to using just the base language model 216. Thus, the utterance recognition module 348 may return the phrase 420, which may include one or more words recognized from the utterance 416.

The application 412 on the user device receives the phrase 420 and may perform one or more functions in response to the phrase 420, depending on the nature of the phrase 420. In this example, since the phrase 420 instructs the application 412 to locate the next occurrence of the phrase "Wicked Witch" in the digital work 204, the application 412 may scan through the digital work 204 to locate the next occurrence of the phrase "Wicked Witch" in the digital work and may present that page of the digital work 204 to the user 106 on the display 408.

As another example, the context information 418 may include not only the identifier of the open digital work 204, but also a user identifier or and/or user device identifier. Accordingly, the utterance recognition module 348 may access a user-specific language model 344 that may include user-specific information, as discussed above, such as a selected quotations, highlights, or the like, to the open digital work or other digital works 204 in the user's library, that may improve the probability of recognizing the user's utterance 416. As one nonlimiting example, a user-specific language model 344 may be generated for the particular user 106 and applied by the utterance recognition module 348 in conjunction with one or more digital work language models 340 during recognition of the utterance 416 from a particular user. As another example, the context information 418 itself may include information regarding highlights, annotations, or the like, already made by the user to the open digital work 204 or one or more other digital works 204.

As still another example, suppose that there is not a digital work language model 340 corresponding to the *Wonderful Wizard of Oz* maintained at the speech recognizing computing device 306. Consequently, the utterance recognition module 348 may apply a category language model 342, if available, for the category of the particular digital work 204. In this example, the category may be children's books, and consequently the utterance recognition module 348 may identify a children's books language model 342 to use during recognition of the utterance 416. As mentioned above, in some cases the category language models 342 may include one or more subcategories so that there may be a hierarchy of language models 216, 342, from general to more specific that may be applied for digital works that do not have their own digital work language model 340 or language model difference information 214.

Figure 5:
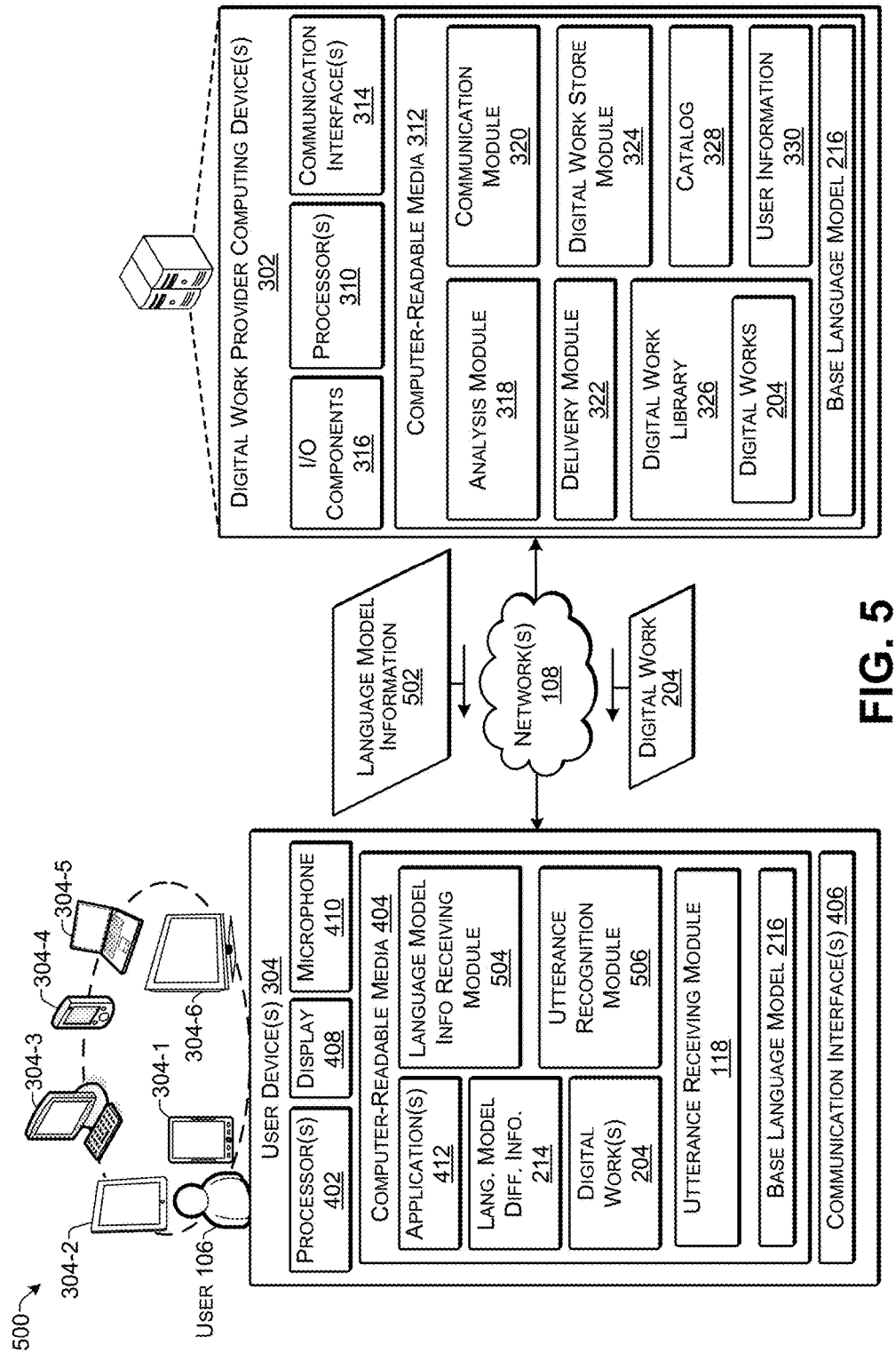
FIG. 5 illustrates an example architecture of a system for context-based utterance recognition on a user device according to some implementations.

FIG. 5 illustrates an example architecture of a system 500 for recognizing an utterance according to some implementations herein. The system 500 includes the one or more user devices 304 that may receive one or more digital works 204 from the digital work provider computing device 302. Furthermore, in this example, the user device 304 may also receive, from the digital work provider computing device 302, language model information 502 corresponding to one or more particular digital works 204 received by the user device 304, the digital work provider computing device 302. For instance, the user device 304 may include a language model information receiving module 504, which may receiving the language model information 502 from the digital work provider computing device 302. The user device 304 may also include an utterance recognition module 506, which may correspond, in some examples, to the utterance recognition modules 110, 348.

The language model information receiving module 504 on the user device 304 may receive the language model information 502 from the digital work provider computing device 302 for a particular digital work 204. For example, the language model information 502 may be provided to the user device 304 when the user 106 purchases or otherwise acquires the digital work 204. Alternatively, the language model information 502 may be received when the user first opens the particular digital work 204 on the user device 304. Still alternatively, the language model information 502 may be provided or acquired when the user 106 first issues an utterance to the utterance receiving module 118. The language model information 502 may include the language model difference information 214, as described above, for the particular digital work 204 that was downloaded to or obtained by the user device 304. Further, if the user device 304 does not already have the base language model 216, the base language model 216 may also be included in the language model information 502.

As one example, when the user 106 downloads the *Wonderful Wizard of Oz* to the user device 304, the language model information 502 for the Wonderful *Wizard of Oz* may also be downloaded to the user device 304. The user may open the Wonderful Wizard of Oz on the user device 304 using, for example, application 412. When the utterance receiving module 118 receives an utterance from the user 106, the utterance may be provided to the utterance recognition module 506. The utterance recognition module 506 may also receive a context of the utterance from the utterance receiving module 118. For example, the utterance receiving module may determine that a particular digital work is currently open on the user device 304. The utterance recognition module 506 may access the corresponding language model difference information 214 for the particular open digital work 204 to use for recognizing the utterance received from the user 106. For example, the utterance recognition module 506 may apply the probabilities of the language model difference information 214 to the base language model 216 to essentially generate and/or use a digital-work-specific language model corresponding to the particular open digital work. Thus, the utterance recognition module 506 may use the digital-work-specific language model during recognition of the utterance made in the context of the particular digital work 204. Alternatively, of course, the user device may include a language model generation module (not shown in FIG. 5) that may generate the digital-work-specific language model for the *Wonderful Wizard of Oz* in advance. However, the entire the digital-work-specific language model may consume a larger amount of storage space on the user device 304 than just the language model difference information 214. Accordingly, the user device 304 may maintain a plurality of different instances of language model difference information 214 for a corresponding plurality of respective digital works 204, such as may be maintained in a collection or library of digital works 204 by the user device 304. Additionally, the foregoing are merely several nonlimiting examples, and numerous other variations will be apparent to those of skill in the art in light of the disclosure herein.

Example Interfaces

Figure 6:
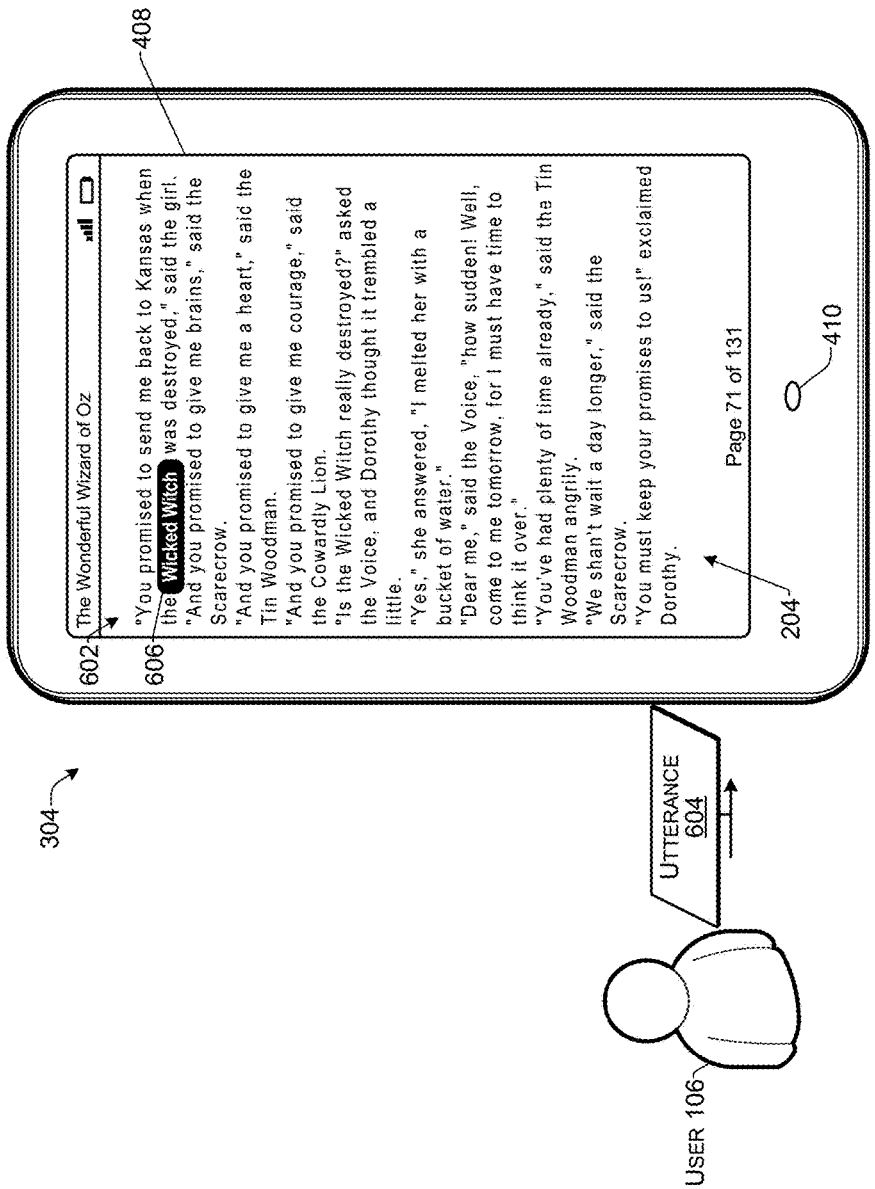
FIG. 6 illustrates an example user device and user interface for performing context-based utterance recognition according to some implementations.

FIG. 6 illustrates an example user device 304 having an example user interface 602 for responding to an utterance 604 received from a user 106 according to some implementations. For example, suppose that the user wishes to perform a search for a quote, character name, setting, location, phrase, or the like, within a digital work 204. In the illustrated example of FIG. 6, the *Wonderful Wizard of Oz* is the digital work 204 displayed on the display 408 of the user device 304. Suppose that the user 106 issues an utterance 604, such as "Locate the next occurrence of Wicked Witch," which is received by the microphone 410. In response, as discussed above with respect to FIGS. 4 and 5, an utterance recognition module (not shown in FIG. 6), either implemented on the user device 304 or at a recognition provider computing device 306, may recognize the utterance 604 based at least in part on context information. For example, the context information may include the identity of the digital work 204 currently being consumed on the user device 304. Thus, based on the context information, the utterance recognition module may select and apply a corresponding context-based language model during recognition. As one example, the recognition module may locate or obtain language model difference information for the Wonderful Wizard of Oz, and apply the language model difference information to a base language model when performing recognition of the utterance 604 to produce a phrase corresponding to the utterance 604.

The user device 304 may then use the recognized phrase to perform one or more functions. In the illustrated example, the user interface 602 has presented a page in the digital work 204 that includes the next occurrence of "-Wicked Witch" in the digital work 204, and has highlighted the occurrence as indicated at 606. Thus, the user 106 may use verbal commands and instructions to navigate through the digital work 204, conduct a search within the digital work 204, and otherwise control or interact with the digital work 204 and/or other digital works maintained on the user device 304 or accessible through the user device 304. Further, the example layout of the interface 602 and digital work 204 is just one nonlimiting example of a possible layout for enabling a user to verbally interact with a digital work 204.

Numerous other possible variations will be apparent to those of skill in the art in light of the disclosure herein.

Example Processes

FIGS. 7-11 illustrate example processes for implementing the techniques described above for recognizing speech. These processes are illustrated as a collection of blocks in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures, frameworks and environments described in the examples herein, although the processes may be implemented in a wide variety of other architectures, frameworks or environments.

Figure 7:
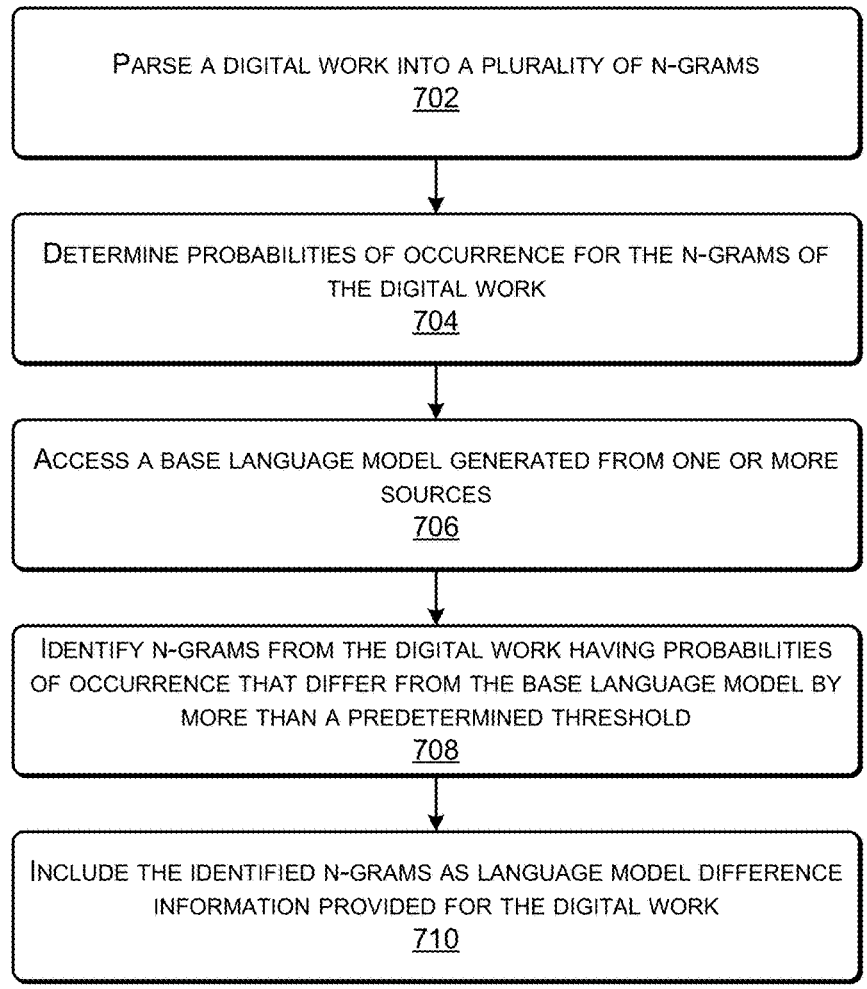
FIG. 7 is a flow diagram illustrating an example process for providing language model difference information according to some implementations.

FIG. 7 is a flow diagram illustrating an example process 700 that may be executed by a digital work provider computing device 302 for providing language model information according to some implementations.

At 702, a digital work is parsed into a plurality of n-grams. For example, the computing device may parse the textual portion of a digital work into a plurality of unigrams, bigrams, trigrams, four-grams, and so forth.

At 704, the probabilities of occurrence are determined for the n-grams of the particular digital work. For example, the n-gram probabilities for the digital work can be determined based at least in part on frequency of occurrence in the digital work.

At 706, the computing device accesses a base language model that has been generated from one or more sources. For example, the base language model may be generated from a large number of digital works such as from thousands or hundreds of thousands of digital works available in a library of digital works. As another example, the base language model may be generated from one or more network resources such as websites, social networks, blogs, newsfeeds, or the like, either alone or in combination with the library of digital works.

At 708, the computing device may identify n-grams from the particular digital work having probabilities that differ from the base language model by more than a predetermined threshold. For example, based at least in part on a frequency of occurrence of on an n-gram in a digital work, numerous different techniques may be used to determine whether a difference in a probability assigned to a particular n-gram is sufficient to meet a predetermined threshold. As one example, a distance measuring technique may be used to determine whether a probability of a particular n-gram is sufficiently distant from the probability in the base language model.

At 710, the n-grams identified as having probabilities of occurrence that are sufficiently distant from those of the base language model may be included in language model difference information provided for the particular digital work. In some implementations, the language model difference information is provided to a speech recognizing computing device, while in other implementations, the language model difference information may be provided to a user device.

Figure 8:
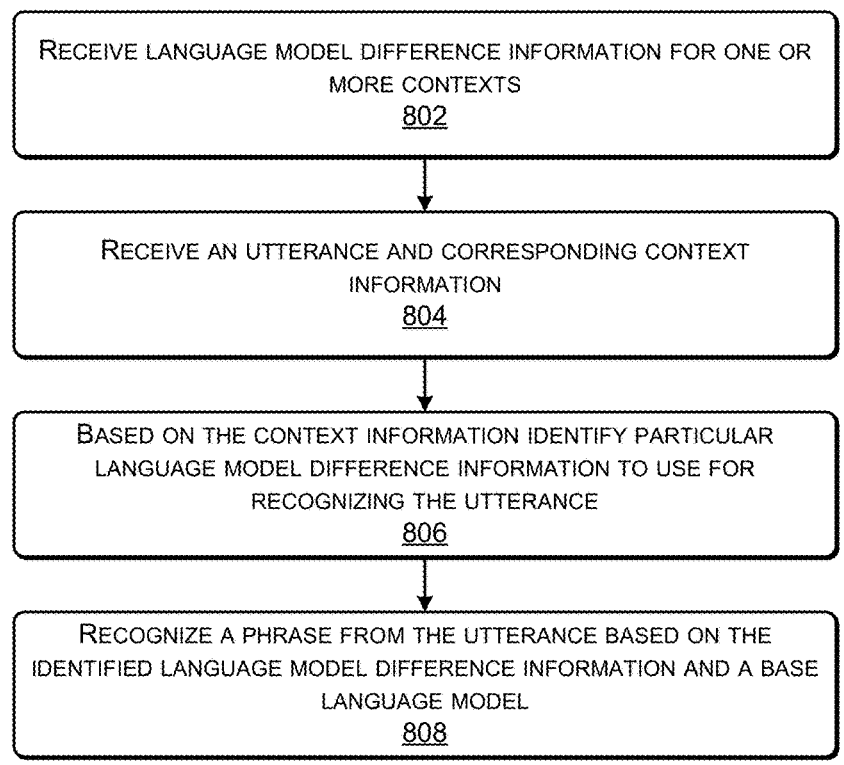
FIG. 8 is a flow diagram illustrating an example process for context-based utterance recognition according to some implementations.

FIG. 8 is a flow diagram illustrating an example process 800 that may be executed by a speech recognizing computing device 306 or a user device 304 to recognize an utterance according to some implementations.

At 802, language model difference information is received for one or more contexts. For example, the language model difference information may be received for each digital work of a plurality of digital works. In some instances, the language model difference information may include a plurality of n-grams that have associated probabilities, based at least in part on frequencies of occurrence, that are different from those of a base language model by a predetermined threshold.

At 804, an utterance and corresponding context information is received. For example, in the case of a speech recognizing computing device, the utterance and context information may be received by a recognition module to perform recognition on the utterance. Furthermore, in the case that recognition is performed on the user device, the utterance and context information may be received by a recognition module executed on the user device.

At 806, based on the context information, a particular instance of language model difference information may be identified for use in recognizing the utterance. For example, more than one instance of language model difference information may be received for a plurality of different contexts such as a plurality of different digital works. Consequently, based on the context information, one or more particular instances of language model difference information may be identified to be used in the context of the particular utterance. For example, when the context information identifies a particular digital work as being the context of the utterance, the instance of language model difference information corresponding to that particular digital work may be identified.

At 808, a phrase is recognized from the utterance based on the identified a language model difference information and a base language model. For example, the recognition module may apply the language model difference information to the base language model during recognition of the utterance.

Figure 9:
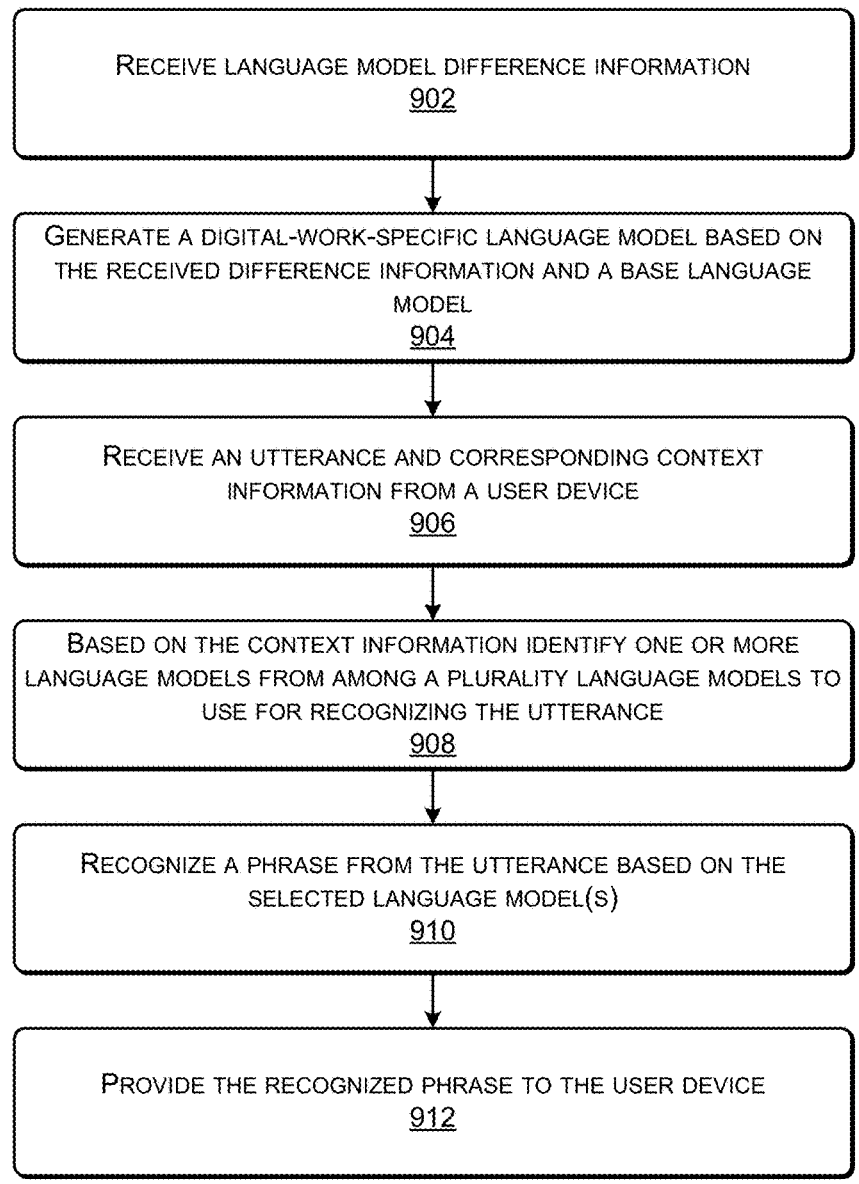
FIG. 9 is a flow diagram illustrating an example process for context-based utterance recognition according to some implementations.

FIG. 9 is a flow diagram illustrating an example process 900 that may be executed by the speech recognizing computing device 306 according to some implementations.

At 902, language model difference information is received from the digital work provider. For example, the speech recognizing computing device may receive language model difference information that includes a plurality of n-grams and associated probabilities of occurrence that differ from a base language model.

At 904, a digital-work-specific language model may be generated based on the received difference information and the base language model. For example, a language model specific to the digital work may be generated by combining the language model difference information and the base language model. Alternatively, the digital-work-specific language model may be generated and/or used during recognition of an utterance.

At 906, an utterance and corresponding context information is received from a user device. For example, the context information may identify one or more particular digital works as the context of the utterance. In other examples, the context information may further identify a user or user device as the context of the utterance.

At 908, based on the context information, one or more particular language models may be identified from among a plurality language models available to be used for recognizing the utterance. For example, the speech recognizing computing device may maintain a large number of language models for a large number of digital works, users, and so forth. Accordingly, based on the context information received with the utterance, the speech recognizing computing device may match the context with one or more appropriate language models to use for performing recognition on the utterance.

At 910, a phrase is recognized from the utterance based on the selected language model(s). For example, the computing device may recognize a phrase of one or more words from the utterance received from the user device.

At 912, the recognized phrase is provided to the user device. For example, the speech recognizing computing device provides the recognized phrase to the user device in response to receiving the utterance and the context information.

Figure 10:
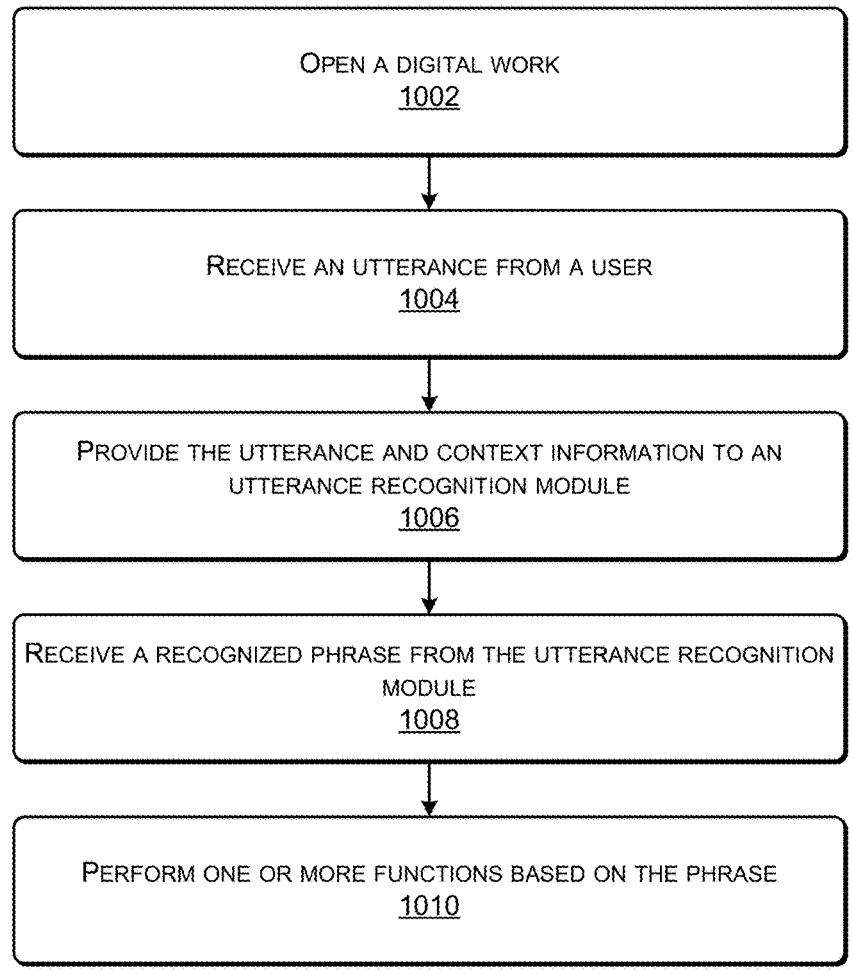
FIG. 10 is a flow diagram illustrating an example process for context-based utterance recognition according to some implementations.

FIG. 10 is a flow diagram illustrating an example process 1000 that may be executed by the user device according to some implementations.

At 1002, a digital work is opened on the user device. For example, a user may initiate a command to cause the user device to display or otherwise open a particular digital work.

At 1004, an utterance is received from a user. For example, the user device may receive an utterance from a user that may include a command, an instruction, or the like.

At 1006, the utterance and corresponding context information is provided to an utterance recognition module. For example, in some implementations, the user device may send the utterance and context information over a network to an utterance recognition module implemented on a speech recognizing computing device. In other implementations, the user device itself may serve as the speech recognizing computing device and the utterance recognition module may be implemented on the user device.

At 1008, a recognized phrase is received from the utterance recognition module. For example, when an online speech recognizing computing device is employed, the phrase may be received over the network. On the other hand, when the user device itself serves as the speech recognizing computing device, the phrase is received from the utterance recognition module.

At 1010, one or more functions are performed based on the phrase. For example, the user device may perform functions such as performing a search within the open digital work for one or more words that correspond to the phrase, navigating within the digital work, opening another digital work, and so forth. Furthermore, implementations are not limited to searching the open digital work but may include searching of other digital works such as one or more digital works maintained in a collection or library of digital works associated with the user device and/or a library of digital works associated with the digital work provider.

Figure 11:
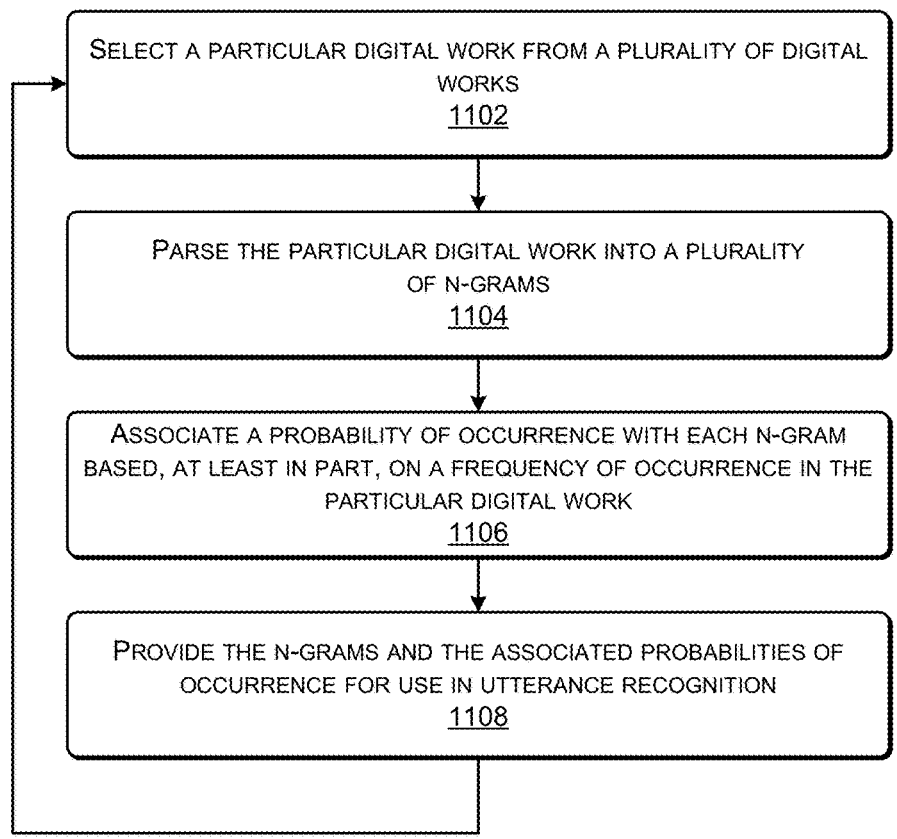
FIG. 11 is a flow diagram illustrating an example process for providing language model information related to a plurality of digital works according to some implementations.

FIG. 11 is a flow diagram illustrating an example process 1100 that may be executed by a digital work provider computing device for providing language model information according to some implementations.

At 1102, a particular digital work selected from a plurality of digital works for processing. For example, the digital work provider may desire to provide language model information relating to a plurality of digital works to a speech recognizing computing device, but the speech recognizing computing device may not have the rights to receive the full text of each digital work.

At 1104, the selected digital work is parsed into a plurality of n-grams, with each n-gram being a sequence of one or more words. For example, the digital work may be parsed into unigrams, bigrams, trigrams, four-grams, and so forth.

At 1106, a probability of occurrence may be associated with each n-gram based, at least in part, on a frequency of occurrence of the n-gram in the particular digital work.

At 1108, the n-grams and associated probabilities of occurrence are provided for use in utterance recognition. For example, the n-grams and associated probabilities may be provided to a speech recognizing computing device of a speech recognition service provider, along with a title or other identifier of the digital work. The speech recognition service provider may use the n-grams and associated probabilities to generate a language model for the particular digital work. Consequently, a digital work provider is able to provide a speech recognition service provider with digital-work-specific language models for a plurality of digital works without having to provide the content of the digital works themselves to the speech recognition service provider.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
   a processor; and
   one or more computer-readable media to store processor-executable instructions that, when executed, program the one or more processors to:
      identify a plurality of n-grams associated with at least a portion of a digital work, an n-gram of the plurality of n-grams comprising a sequence of at least one or more words, one or more phonemes, one or more syllables, one or more letters, or one or more base pairs;
      associate a first probability of occurrence with the n-gram based at least in part on a frequency of occurrence in at least the portion of the digital work;

determine language model difference information based at least in part on the first probability of occurrence associated with the n-gram differing from a second probability of occurrence of the n-gram in a base language model by more than a threshold amount; and determine a word based at least in part on a captured utterance, the base language model, and the language model difference information.

2. The device as recited in claim 1, wherein the processor-executable instructions further program the one or more processors to generate the base language model based at least in part on at least one of a webpage, an electronic book, a news feed, a social network site, a microblog, or a closed captioning feed.

3. The device as recited in claim 1, wherein the processor-executable instructions further program the one or more processors to generate the base language model from a plurality of digital works.

4. The device as recited in claim 1, further comprising a communication interface, and wherein the processor-executable instructions further program the one or more processors to send, via the communication interface, the language model difference information and the base language model to a speech recognizing computing device that provides an utterance recognition service.

5. The device as recited in claim 1, further comprising a communication interface, and wherein the processor-executable instructions further program the one or more processors to send, via the communication interface, the language model difference information to a user device in association with providing the digital work to the user device.

6. The device as recited in claim 1, further comprising a communication interface, and wherein the processor-executable instructions further program the one or more processors to:

receive, via the communication interface, the captured utterance from a user device; and send, via the communication interface, information associated with the word to the user device.

7. The device as recited in claim 6, wherein the processor-executable instructions further program the one or more processors to receive, via the communication interface, context information associated with the utterance, the context information identifying the language model difference information.

8. The device as recited in claim 1, further comprising a communication interface, and wherein the processor-executable instructions further program the one or more processors to:

receive, via the communication interface, user information corresponding to the digital work from a plurality of user devices; and wherein the first probability of occurrence associated with the n-gram is weighted based at least in part on the user information.

9. The device as recited in claim 8, wherein the user information includes at least one of information corresponding to a user highlight of the digital work or information corresponding to a user annotation to the digital work.

10. A method executable by one or more computing processors to perform operations comprising:

identify a plurality of n-grams included in user information associated with at least a portion of a digital work, an n-gram of the plurality of n-grams comprising a sequence of one or more words;

associating a first probability of occurrence with the n-gram based at least in part on a frequency of occurrence of the n-gram in at least the user information;

determining language model difference information based at least in part on the first probability of occurrence associated with the n-gram differs from a second probability of occurrence of the n-gram in a base language model by more than a threshold amount; and determining a word based at least in part on a captured utterance, the base language model, and the language model difference information.

11. The method as recited in claim 10, wherein the base language model includes a probability-weighted distribution of n-gram sequences for a language associated with the digital work.

12. The method as recited in claim 10, wherein determining that the first probability of occurrence associated with the n-gram differs from the second probability of occurrence of the n-gram in the base language model by more than the threshold amount comprises determining that the first probability of occurrence associated with the n-gram differs from the second probability of occurrence of the n-gram in the base language model by more than a predetermined distance between the first probability of occurrence and the second probability of occurrence.

13. The method as recited in claim 10, further comprising generating the base language model based at least in part on a plurality of digital works.

14. The method as recited in claim 10, further comprising generating the base language model based at least in part on at least one of a webpage, an electronic book, a news feed, a social network site, a microblog, or a closed captioning feed.

15. The method as recited in claim 10, further comprising determining language model difference information for the digital work based at least in part on the second probability of occurrence associated with the n-gram differing from the first probability of occurrence of the n-gram by more than the threshold amount.

16. The method as recited in claim 10, wherein identifying the plurality of n-grams included in the user information associated with the at least the portion of the digital work comprises identifying the plurality of n-grams included in at least one of user highlights, user annotations, or user-created content.

17. One or more non-transitory computer-readable media maintaining instructions executable by one or more processors to perform operations comprising:

determining an n-gram comprising a sequence of one or more words based at least in part on parsing a plurality of digital works, wherein the plurality of digital works are associated with a particular subject matter category;

associating a first probability of occurrence with the n-gram based at least in part on a frequency of occurrence of the n-gram in the plurality of digital works; and determining language model difference information based at least in part on the first probability of occurrence associated with the n-gram differs from a second probability of occurrence of the n-gram in a base language model by more than a threshold amount; and determining a word based at least in part on a captured utterance, the base language model and the language model difference information.

18. The one or more non-transitory computer-readable media as recited in claim 17, wherein the base language model includes a probability-weighted distribution of n-gram sequences for a language associated with the plurality of digital works.

19. The one or more non-transitory computer-readable media as recited in claim 17, the operations further comprising: sending the language model difference information to the computing device.

20. The one or more non-transitory computer-readable media as recited in claim 17, further comprising generating the base language model based at least in part on at least one of a webpage, an electronic book, a news feed, a social network site, a microblog, or a closed captioning feed.

* * * * *